United States Patent
Meillat et al.

(10) Patent No.: US 9,623,980 B2
(45) Date of Patent: Apr. 18, 2017

(54) FUEL STORAGE DEVICE, AN AIRCRAFT, AND A METHOD

(71) Applicant: AIRBUS HELICOPTERS, Marignane (FR)

(72) Inventors: Roland Meillat, Saint-Cannat (FR); Stephane Mougin, Rousset (FR)

(73) Assignee: AIRBUS HELICOPTERS, Marignane (FR)

( * ) Notice: Subject to any disclaimer, the term of this patent is extended or adjusted under 35 U.S.C. 154(b) by 375 days.

(21) Appl. No.: 14/074,745

(22) Filed: Nov. 8, 2013

(65) Prior Publication Data
US 2014/0137979 A1    May 22, 2014

(30) Foreign Application Priority Data
Nov. 19, 2012    (FR) ..................... 12 03101

(51) Int. Cl.
| | |
|---|---|
| *B64D 37/06* | (2006.01) |
| *B64D 37/20* | (2006.01) |
| *B64D 37/24* | (2006.01) |
| *B64D 37/16* | (2006.01) |
| *B64C 27/04* | (2006.01) |

(52) U.S. Cl.
CPC ............. *B64D 37/06* (2013.01); *B64D 37/16* (2013.01); *B64D 37/20* (2013.01); *B64D 37/24* (2013.01); *B64C 27/04* (2013.01)

(58) Field of Classification Search
CPC ........ B64D 37/06; B64D 37/08; B60K 15/03; B60K 2015/03473; B60K 2015/03368
USPC ...... 141/4–5, 114, 313–317; 220/723, 62.21, 220/530; 244/135 B; 137/223, 228; 123/516–519
See application file for complete search history.

(56) References Cited

U.S. PATENT DOCUMENTS

| | | | |
|---|---|---|---|
| 2,654,553 A | * | 10/1953 | Cyril ..................... B64D 37/02 244/135 R |
| 2,657,884 A | | 11/1953 | Merrill |
| 2,736,356 A | | 2/1956 | Bender |
| 3,409,253 A | | 11/1968 | Berg |

(Continued)

FOREIGN PATENT DOCUMENTS

| | | |
|---|---|---|
| CA | 2851968 A1 | 5/2013 |
| CN | 1301230 A | 6/2001 |

(Continued)

OTHER PUBLICATIONS

Canadian Search Report Dated May 20, 2015, Application No. 2,830,709, Applicant Airbus Helicopters, 5 Pages.

(Continued)

*Primary Examiner* — Timothy L Maust
*Assistant Examiner* — Timothy P Kelly
(74) *Attorney, Agent, or Firm* — Brooks Kushman P.C.

(57) ABSTRACT

A fuel storage device (10) having at least one tank (15), the tank (15) having a casing (20) extending upwards from a bottom (21) to a top wall (22). The storage device (10) is provided with at least one inflatable bag (25) arranged inside said casing, said device including inflation/deflation means (35) for inflating each inflatable bag (25) at least in part so as to reach an inflated volume prior to filling the tank, and for deflating said inflatable bag after filling in order to guarantee the presence of an expansion volume inside said tank.

16 Claims, 3 Drawing Sheets

(56) References Cited

U.S. PATENT DOCUMENTS

| | | | |
|---|---|---|---|
| 4,026,503 | A | 5/1977 | Rhodes |
| 4,799,509 | A | 1/1989 | Wawra |
| 5,927,651 | A | 7/1999 | Geders |
| 6,021,978 | A | 2/2000 | Goss |
| 6,527,002 | B1 | 3/2003 | Szakaly |
| 7,621,483 | B2 | 11/2009 | Cozens |
| 8,002,142 | B2 | 8/2011 | Losinski |
| 2002/0121300 | A1 | 9/2002 | Ehrman |
| 2005/0199294 | A1 | 9/2005 | Vaitses |
| 2009/0314783 | A1 | 12/2009 | Losinski et al. |

FOREIGN PATENT DOCUMENTS

| | | |
|---|---|---|
| DE | 3719834 A1 | 3/1988 |
| DE | 4121321 A1 | 1/1993 |
| DE | 19925728 A1 | 12/2000 |
| EP | 0233681 A2 | 8/1987 |
| EP | 2135805 A2 | 12/2009 |
| FR | 2294913 A1 | 7/1976 |
| GB | 2434416 A | 7/2007 |

OTHER PUBLICATIONS

Canadian Search Report Dated Dec. 30, 2014, Application No. 2,830,709, Applicant Airbus Helicopters, 3 Pages.
Search Report and Written Opinion; Application No. FR1203101; dated May 23, 2013.
Chinese Second Office Action Dated Mar. 4, 2016, Application No. 201310581719.4, Applicant Airbus Aelicopters, 10 Pages.
Chinese First Office Action Dated Aug. 5, 2015, Application No. 201310581719.4, Applicant Airbus Helicopters, 12 Pages.

\* cited by examiner

FUEL STORAGE DEVICE, AN AIRCRAFT, AND A METHOD

CROSS REFERENCE TO RELATED APPLICATION

This application claims priority to French patent application FR 12 03101 filed on Nov. 19, 2012, the content of which is incorporated in its entirety by reference herein.

BACKGROUND OF THE INVENTION (1) Field of the Invention

The present invention relates to a fuel storage device provided with a tank, to an aircraft provided with such a tank, and to a method of controlling such a tank.

More particularly, but not exclusively, the invention relates to an aircraft and in particular to an aircraft having a rotary wing. A rotary wing aircraft presents specific characteristics that lead to differences that are considerable compared with an airplane or a car.

(2) Description of Related Art

A fuel storage device usually comprises at least one tank containing the fuel. In addition, the storage device usually includes an expansion volume.

Such an expansion volume serves to receive some of the fuel stored in the tanks in the event of the fuel expanding. The expansion volume then avoids high pressures being applied to the walls of the tanks, and/or avoids fuel overflowing, e.g. via a vent system.

Aircraft certification regulations may require a minimum volume for this expansion volume. For example, paragraph 969 of the certification regulation known under the name "CS 29" specifies that the expansion volume must be greater than or equal to 2% of the total volume of tanks.

Furthermore, that paragraph specifies that it must be impossible to fill that expansion volume inadvertently when the aircraft is in a normal position on the ground.

It should be observed that the term "normal position" or "normal condition" designates positions that the manufacturer of the vehicle has authorized for use during filling. These authorized positions may be defined for example relative to threshold roll and pitching angles for the vehicle.

It may thus be strictly forbidden to fill the expansion volume even in part when filling the tanks, in order to ensure that the expansion volume is fully available in the event of the fuel expanding in flight.

Furthermore, a fuel storage device generally includes a vent circuit enabling some of the gas contained in the storage device to be discharged into the atmosphere.

In order to provide an expansion volume, a first technique makes provision for using the top portion of a tank as an expansion volume, this expansion volume communicating with the atmosphere via a vent system.

Nevertheless, it can be understood that the filler orifice needs to be positioned with care so that the top portion of the tank is not filled when filling the tank. This top portion must then be vertically above a filling plane that contains the filler orifice.

That first technique presents the advantage of being simple. However, the constraint associated with the positioning of the filling orifice can make it difficult to incorporate in certain aircraft, and in particular in aircraft presenting tanks arranged within a lower section of the fuselage arranged beneath a cabin floor.

In a second technique, an expansion vessel is used that defines the required expansion volume.

The expansion vessel is distinct from the tank with which it is in communication. Under such circumstances, the expansion vessel may be offset from the tank, e.g. in a high portion of a vent circuit.

It can be understood that it is then easier to position the expansion space in a plane situated above a filler orifice. Nevertheless, it can be difficult to find space within an aircraft that is suitable for receiving the expansion vessel.

Furthermore, this second technique sometimes leads to providing auxiliary safety means in order to avoid a risk of fire in the event of a crash, possibly made worse by the presence of expanded fuel in a remotely-located expansion vessel.

Finally, it will be understood that that second technique leads to a configuration that is relatively complex, and to difficulties in maintenance.

In the automobile field, fuel tanks are known that are hermetically closed by a filler cap that seals hermetically and that is provided with an auxiliary device for putting the content of the tank to atmospheric pressure.

That auxiliary device is obtained by a pipe going from the top portion of the tank towards a container containing activated carbon.

This container contains activated carbon in order to depollute the gas that has escaped from the fuel tank before it is exhausted into the atmosphere.

In addition, the system has an expansion vessel arranged between the fuel tank and said container.

In order to prevent fuel penetrating into the expansion vessel during filling, the car is generally provided with devices for closing the vent circuit while the filler cap and/or the filler hatch provided in the bodywork of the vehicle are open.

Rotary wing aircraft and in particular helicopters are conventionally not fitted with a container for a gas filter. The fuel tank is connected directly to the atmosphere by pipes, possibly via at least one roll-over valve in the vent serving to prevent the fuel tank being emptied through the vent circuit in the event of the aircraft overturning.

There is no need for the fuel to be subjected to any particular pressure on such a vehicle. That is why the person skilled in the art sometimes uses the first above-mentioned technique in order to obtain an expansion volume inside the tank.

On a vehicle of the airplane type, the fuel tanks are generally arranged in the wings. The configuration problem associated with an airplane is thus completely different from the problem associated with a rotary wing aircraft, e.g. of the helicopter type.

On a light airplane, fuel is generally refilled via a hatch arranged in the top wall of the fuel tank. Since the wing usually slopes, a fraction of the tank remains empty after filling and thus represents the required expansion volume.

In some airplanes, a plurality of tanks are arranged inside the wings. Those tanks communicate with a vent chamber via a vent line.

In the event of the fuel expanding in flight, the fuel may penetrate into the vent chamber. Transfer pumps then serve to return the fuel from the vent chamber back to the tank.

Document U.S. Pat. No. 7,621,483 describes a configuration of that type.

The tanks are under pressure. In addition, the fuel storage device presents complexity and dimensioning that appear not to be compatible with the requirements of rotary wing aircraft, in particular of the helicopter type.

In the technological background, there is document DE 199 25 728, which describes an expansion vessel arranged in series in a vent circuit. The expansion vessel is also arranged inside a tank.

Under such circumstances, the expansion volume defined by the expansion vessel communicates firstly with the inside of the tank via an assembly having at least a first valve, and secondly with the outside via a second valve and an activated carbon treatment system.

As a function of the pressure difference between the expansion volume and the inside of the tank, the fuel can move from the tank towards the expansion vessel, and vice versa.

Furthermore, document EP 0 233 681 describes a fuel storage device having a tank and an expansion vessel arranged inside the tank.

Document US 2005/199294 describes a tank connected to a filler tube opening out at a filler orifice. In addition, a vent line connects the tank to the outside atmosphere.

Under such circumstances, an expansion vessel is arranged outside the tank, the expansion vessel being connected by a high hose and a low hose to said vent line.

In addition, the filler orifice is also present in a plane below said hoses.

Document US 2002/121300 describes a tank connected to a filler tube leading to a filler orifice. In addition, an expansion vessel is arranged in the tank. A pipe then extends from said expansion vessel to a vapor treatment system.

Document DE 37 19 834 describes a tank. In addition, an expansion vessel is arranged in the tank. A pipe then extends from said expansion vessel to the outside.

Also known is Document DE 41 21 321. The expansion vessel has a wall made of foam with open cells, and the expansion vessel fills with fuel less quickly than the tank.

Although advantageous, that storage device does not appear to be compatible with the certification regulations that specify that it must not be possible for the expansion volume to be filled inadvertently when the aircraft is in a normal position on the ground.

Furthermore, depending on the shape of the tank and on the position of the feed zone, it is possible that there is a volume of fuel that cannot reach the feed pipe. This volume of fuel is sometimes referred to as the "non-consumable volume" insofar as this volume of fuel cannot be consumed by an engine.

In order to minimize the non-consumable volume in tanks, manufacturers use sloping surfaces in the bottoms of tanks so as to direct fuel towards the feed pipe. Such surfaces are referred to herein as "slopes" for simplification purposes. The slopes may slope in the longitudinal direction and in the transverse direction of the vehicle.

Under such circumstances, tanks may be made out of flexible material. By way of example, such a material comprises a polyester support with a mixture of elastomers. Foams inserted in the compartment of tanks thus make it possible to provide slopes on which a flexible tank rests.

Nevertheless, installing foams and selecting shapes for the bottom corners of tanks lead to non-negligible losses of the volume of fuel that can be taken on board. In addition, differences in performance between aircraft mean that the shape of each tank needs to be designed as a function of the aircraft, thus preventing any type of standardization.

Furthermore, the added foams present non-negligible weight.

Document U.S. Pat. No. 5,927,651 discloses a fuel tank device having a deformable elastomer structure capable of adapting to the shapes of a compartment.

Document FR 2 294 913 discloses expandable fuel storage means capable of being expanded and of occupying a position in which they are located at least in part outside a zone of an airplane referred to as a "surface zone".

Document U.S. Pat. No. 3,409,253 discloses a retractable tank system for aircraft, the system being made up of rigid means surrounding a flexible surface for adapting to the quantity of fuel taken on board.

It can be understood that a fuel storage device constitutes a system that is complex and difficult to optimize. The consumable volume that is stored may be reduced by an expansion volume and by including slopes.

Documents EP 2 135 805, U.S. Pat. No. 2,736,356, U.S. Pat. No. 2,657,884, and U.S. Pat. No. 6,021,978 are remote from the field of the invention.

Document EP 2 135 805 describes an open-topped tank. A bag is arranged inside the tank, with the volume of the bag depending on the pressure that exists outside the tank.

Document U.S. Pat. No. 2,657,884 describes a tank having inflatable members arranged between stiffeners. Those inflatable members seek to remove fluid that becomes caught between the stiffeners.

Document U.S. Pat. No. 2,736,356 describes a fuel tank that is separated from pressurizing means by a movable diaphragm.

Document U.S. Pat. No. 6,021,978 describes a volume seeking to protect a tank against risks of explosion.

BRIEF SUMMARY OF THE INVENTION

An object of the present invention is thus to provide a novel storage device that is capable in particular of satisfying requirements relating to an expansion volume.

According to the invention, a fuel storage device is provided with at least one tank, the tank having a casing extending upwards from a bottom to a top wall.

The storage device is provided with at least one inflatable bag arranged inside said casing, said storage device including inflation/deflation means for inflating each inflatable bag at least in part so as to reach an inflated volume prior to filling the tank, and for deflating said inflatable bag after filling in order to guarantee the presence of an expansion volume inside said tank.

The inflated volume is then not less than the expansion volume that needs to be guaranteed in the storage device.

The storage device thus includes an expansion device for providing an expansion volume, the expansion device being provided with at least one inflatable bag and with inflation/deflation means.

Under such circumstances, the inflatable bag is inflated before filling. The space occupied by the inflatable bag inside the casing is therefore not occupied by liquid during filling.

At the end of filling, each inflatable bag is deflated by automatic control means or by a command from the crew. The storage device is then provided with an expansion volume that is not less than the inflated volume of the bags prior to filling. The inflatable bag can be deflated on the ground, i.e. before flight, and it may optionally be deflated immediately after filling.

Thus, it is not possible to fill the expansion volume by error while filling. None of the bags is in communication with the tank, and thus once deflated each bag releases an expansion volume.

As a result, the expansion volume is present inside the tank. The invention thus describes a device that does not include an expansion vessel. The device may also be effective regardless of the location of the fuel filler orifice.

In the absence of an expansion vessel arranged within the aircraft, aircraft safety is improved. Furthermore, the position of the center of gravity of the aircraft is not modified by having a non-negligible weight of fuel located high up in the event of the fuel expanding.

Incorporation of the fuel system in an aircraft is also simplified. For example, there is no need for a transfer pump to cause fuel to flow between an expansion vessel and a tank in order to empty the expansion vessel.

The invention thus proposes a system that is simple, while nevertheless guaranteeing the presence of an expansion volume within the tanks that satisfies the requirements of certification regulations.

Furthermore, the crew of the aircraft may optionally decide not to use the expansion volume in order to fill the fuel tank to its maximum volume (in an application that does not require an expansion volume).

The storage device may also include one or more of the following characteristics.

By way of example, each bag may be provided with an envelope of material that is strong and leaktight.

In a first embodiment, at least one bag is fastened to the top wall of the tank. The inflatable bag is then inflated and deflated solely for the purpose of providing an expansion volume.

In a second embodiment, each bag may optionally perform not only one, but two fundamental functions. Each bag makes it possible to provide an expansion volume and also to direct fuel towards a feed zone. The useful volume of the tank is thus used to the full.

In a second embodiment, at least one bag is fastened to said bottom firstly to provide an expansion volume and secondly to provide at least one slope having a variable angle of inclination for the purpose of directing fuel towards a predetermined zone of the tank by gravity.

By using an expansion device, this combination makes it possible to create an expansion volume that is completely safe and also to increase the fuel content of tanks. Furthermore, this combination may be incorporated in a system that is already in existence.

In addition, this combination makes it easy to manage the distribution of weights within the aircraft. By varying the extent to which bags are inflated within inter-connected tanks, the crew can decide, for example, to eliminate the expansion volumes in the central tanks (close to the center of gravity of the aircraft) so as to combine the expansion volumes in a tank that is further from the center.

The predetermined zone may then be a feed zone of the tank, i.e. a zone of the tank that receives an inlet section of a pipe for transferring fuel to an engine. When the transfer pipe has a transfer pump, the slope may direct fuel towards the transfer pump.

Each inflatable bag may rest on the bottom of the tank, being fastened thereto in reversible or non-reversible manner. The variable slope provided by a bag is then a surface of the bag that slopes towards the feed zone in the bottom of the tank.

Under such circumstances, the invention presents a tank having a bottom with a slope that is variable under the control of inflation/deflation means.

Each slope may vary between a minimum position corresponding to a zero or almost zero slope, and a maximum position corresponding to a maximum slope as defined by the manufacturer.

By inflating an inflatable bag, the inflation/deflation means increase the angle of inclination of a slope formed on the bottom of the tank. Conversely, by deflating the inflatable bag, the inflation/deflation means reduce the angle of inclination of a slope formed on the bottom of the tank.

Thus, the invention does not provide a tank having a fixed slope achieved by using foam, or a flexible tank that matches the shape of its container and/or that adapts to the volume of fuel it contains.

The invention goes against prejudice by managing the angle of inclination of the slope at the bottoms of tanks. Consequently, at least one tank presents at least one variable slope implemented with the help of an inflatable bag and inflation/deflation means.

Such a slope may also have a bottom presenting at least one slope that is movable as a function of the quantity of fuel present in the tank.

For example, before filling the tank, the inflatable bags may be inflated at least in part.

The tank may then receive a volume of fuel that is maximized while nevertheless guaranteeing the presence of an expansion volume at the end of filling.

At the end of filling, the bags are deflated in order to provide the required expansion volume.

For this purpose, the device may contain indicator means for indicating the end of filling. By way of example, such indicator means may be provided with a level sensor, with warning means, and/or with manual indicator means.

Partially inflating the bags before filling does not seek to provide slopes serving to direct fuel towards a feed zone, but rather to reserve an expansion volume within the tank.

In contrast, when the tank begins to empty, the inflation/deflation means may inflate the inflatable bags in part or in full. This operation may be performed once the volume of fuel contained in the tank has diminished. Thus, the presence of a bag that is inflated does not prevent the minimum expansion volume also being present in the tank.

The tank then has slopes in its bottom so as to further minimize the volume of fuel that is not consumable.

The storage device thus makes it possible to optimize the consumable volume of fuel while also guaranteeing an expansion volume, without going beyond the general inventive concept.

The slope provided by an inflatable bag may for example reach three predetermined angles of slope, namely:
  an intermediate angle of slope that is reached prior to filling the tank;
  a minimum angle of slope that is reached after the tank has been filled; and
  a maximum angle of slope to be reached below a fuel threshold in order to direct fuel towards a feed zone.

Optionally, each bag may be compartmentalized so as to present a first compartment for inflating/deflating an expansion volume, and a second compartment for providing a slope. Each stage can then be performed accurately.

Furthermore, the storage device may include measurement means for measuring the volume of fuel and connected to the inflation means in order to adjust said angle of inclination automatically as a function of said volume.

Under such circumstances, the inflation/deflation means inflate at least one bag as a function of the quantity of fuel present in the tank.

The measurement means may comprise a gauging system, or a sensor placed at a defined height by the manufacturer in order to detect the presence of fuel at that height.

Consequently, the inflation/deflation means may optionally inflate at least one inflatable bag below a threshold level of fuel in order to provide adequate slopes.

In a variant that may be used as an alternative or in addition, the storage device includes a measurement system for measuring flight duration.

The manufacturer may set a flight duration beyond which the inflatable bags need to be deployed in full.

It can be understood that at the end of said flight duration, the quantity of fuel remaining in the tank must not impede deploying the inflatable bags.

In a variant that may be used as an alternative or in addition, the storage device includes manual control means for controlling the inflation/deflation means.

The crew can then decide the appropriate moment for inflating the inflatable bags.

Furthermore, the crew may optionally adjust the angle of inclination of the slopes by adjusting the pressure of the inflation fluid contained in each inflatable bag. Thus, the crew may adjust said angle of inclination in order to adapt it as closely as possible to the type of mission that is to be performed.

Furthermore, the storage device may include a pressure sensor. This pressure sensor makes it possible to deliver information relating to the slope provided by an inflatable bag.

By way of example, said storage device is provided with display means for displaying information relating to said slope. The display means may thus co-operate with a pressure sensor to determine whether an inflatable bag is inflated or deflated.

By way of example, the storage device may also be provided with warning means to warn an individual that the bags are indeed inflated.

Furthermore, when the device is provided with a gauging system for measuring the depth of fuel in the tank, the gauging system may include a gauging relationship for each authorized angle of inclination of the slope, each gauging relationship providing the volume of fuel as a function of said depth.

The term "gauging relationship for each angle of inclination" is used to mean either making use of a plurality of relationships, or else making use of a single relationship presenting at least one parameter that varies as a function of the state of the inflatable bags.

When the inflatable bags are inflated, it can be understood that the shape of the bottom volume inside the tank is modified.

Consequently, the gauging relationship is modified when the inflatable bags are inflated.

Such a gauging system may include a fuel gauge and a processor unit. The processor unit then communicates with dedicated means for determining the state of the inflatable bags, e.g. a pressure sensor.

Independently of the embodiment, the storage device may also include means for reversibly fastening each inflatable bag to a tank.

In addition to a storage device, the invention also provides an aircraft including such a storage device.

Furthermore, the invention provides a method of storing fuel that makes use of the storage device.

In the method, at least one inflatable bag is inflated at least in part in order to provide an expansion volume in the tank prior to filling the tank, and then each inflatable bag is deflated at the end of filling.

This method may include one or more of the following characteristics.

Thus, each inflatable bag may be inflated when the volume of fuel is less than a predetermined threshold after filling in order to provide a slope at the bottom of a tank enabling the fuel contained in the tank to be directed by gravity towards a predetermined zone of the tank as a function of the level of fuel.

For example, in order to provide a slope enabling the fuel contained in the tank to be directed by gravity towards a predetermined zone, the following steps may be performed:
  when the volume of fuel is greater than said threshold after filling, said inflatable bag is inflated once the volume of fuel drops below the predetermined threshold; and
  when the volume of fuel does not reach said threshold on filling, said inflatable bag is inflated at the end of filling.

Consequently, at the end of filling fuel, the inflatable bags are inflated only below a fuel threshold.

Consequently, if the filling of the tank does not enable said threshold to be reached, then the inflatable bags can be inflated after the filling. In this configuration, it is possible to inhibit deflation of the bags at the end of filling.

In contrast, if the tank is filled sufficiently for the quantity of fuel stored to cross said threshold, then the inflatable bags are inflated when said quantity has dropped below said threshold.

An automatic procedure may then be implemented for managing the slopes present in the bottom of the tank.

In alternative or additional manner, inflation of the bags may also be requested manually.

Furthermore, at least one gauging relationship may be determined to provide a volume of fuel as a function of a depth of fuel in the tank, and said gauging relationship may be modified when said slope is modified.

This modification may be obtained by using a plurality of gauging relationships, or by modifying at least one parameter of a gauging relationship.

Optionally, when the storage device is used on an aircraft having at least one engine, it is possible to deflate each inflatable bag when said engine is stopped.

Manual inhibit means may optionally be provided to prevent such deflation taking place on order from the crew.

In a preferred method, the following steps are performed:
  a) partially inflating the bags by means of an automatic command or a command delivered by the crew in order to maintain an expansion volume while filling fuel;
  b) displaying information concerning partial inflation of the bags to the crew;
  c) filling the tank with fuel up to a level determined by the crew;
  d) completely deflating the bags;
  e) if the level of fuel has not reached a predetermined threshold at the end of filling, completely inflating the bags;
  f) if the level of fuel reached the predetermined threshold at the end of filling, then when the level of fuel drops below the predetermined threshold, triggering a warning to trigger complete inflation of the bags (passively or actively);
  g) modifying the gauging relationship of the tank as a function of the new configuration; and
  h) automatically deflating the bags after the engines have been stopped, unless the crew issue a contrary command.

Optionally, it is possible to inhibit step d) if step e) is to be performed.

Below the threshold, the tank necessarily presents the required expansion volume.

Furthermore, each inflatable bag may be deflated at the end of filling on the ground, in particular before moving the aircraft, in order to guarantee that the expansion volume is present while on the ground.

Optionally, each inflatable bag may be deflated immediately after filling.

BRIEF DESCRIPTION OF THE SEVERAL VIEWS OF THE DRAWINGS

The invention and its advantages appear in greater detail from the following description of embodiments given by way of illustration and with reference to the accompanying figures, in which.

Elements present in more than one of the figures are given the same references in each of them.

DETAILED DESCRIPTION OF THE INVENTION

Figure 1:
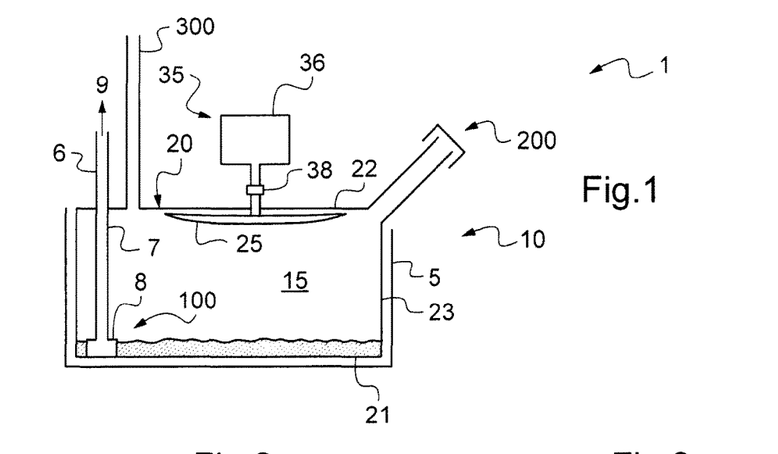
FIG. 1 is a view of an aircraft provided with a storage device in a first embodiment.

FIG. 1 shows a vehicle 1 in a first embodiment of the invention. By way of example, the vehicle is an aircraft, such as an aircraft having a rotary wing.

The aircraft 1 possesses a storage device 10. The storage device 10 may in particular be a system for storing fuel for feeding to a power plant 9.

The other members of the aircraft are not shown in order to avoid overcrowding FIG. 1.

Independently of the embodiment, the storage device is provided with at least one tank 15 arranged in a compartment 5 of the vehicle 1. The tank 15 has a casing 20 defining a storage space.

The casing 20 thus extends in elevation from a bottom 21 to a top wall 22, which are spaced apart by side walls 23.

Furthermore, the storage device 10 includes a fuel transfer pipe 6 opening out into a predetermined fuel transfer zone 100 of the tank 15. This pipe 6 may comprise either at least one fuel transfer pipe 7, or else as in the example shown at least one fuel transfer pipe 7 and a booster pump 8.

The storage device may also comprise a vent system 300 and a filler system 200, such as a gravity filler system.

The storage device then comprises a system for arranging an expansion volume in the tank 15. The storage device 10 is provided with at least one bag 25 arranged inside the casing 20.

In addition, inflation/deflation means 35 are connected to each bag 25 in order to inflate each inflatable bag 25 using a predetermined method. The inflation/deflation means 35 may include a pressure generator 36 communicating with at least one inflatable bag 25 via a hose pipe and a valve 38. The inflation/deflation means 35 may be activated manually or automatically via a control unit that applies a procedure defined by the manufacturer.

Any reversible system for inflating/deflating a bag may be used.

In addition, the device is optionally fitted with warning means for indicating the state of each bag to crew.

The inflation/deflation means 35 inflate each bag at least in part in order to reach an inflated volume prior to filling the tank, and deflates said inflatable bag after filling in order to guarantee that an expansion volume is present in said tank.

In a first embodiment, each inflatable bag is fastened inside the tank to the top wall 32 of the casing, possibly by reversible means.

Figure 2:
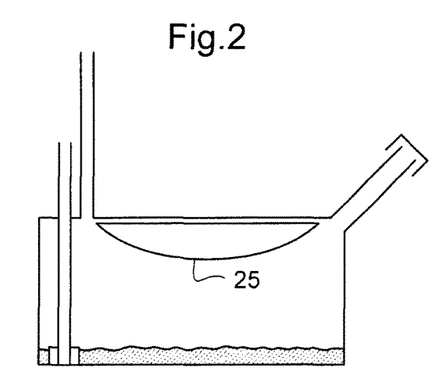
FIGS. 2 to 5 are views explaining the method implemented in the first embodiment.

With reference to FIG. 2, at least one inflatable bag is inflated at least in part before filling the tank.

In the first embodiment, each inflatable bag is inflated completely by the inflation/deflation means 35.

Figure 3:
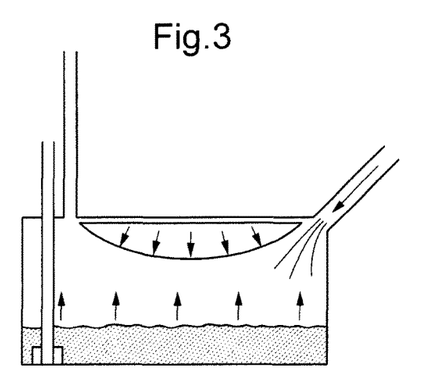

The fuel tank is filled while in this condition, as shown in FIG. 3.

Figure 4:
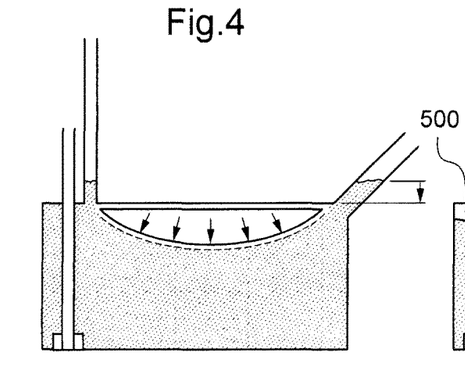

The level of fuel in the tank rises and may "immerse" the inflatable bag, as shown in FIG. 4.

Thereafter, at the end of filling, each inflatable bag is deflated by the inflation/deflation means 35.

Figure 5:
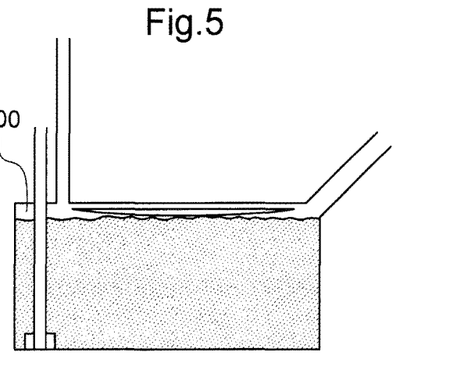

With reference to FIG. 5, this results in a drop in the level of the fuel, thereby enabling an expansion volume 500 to be created within the tank.

Figure 6:
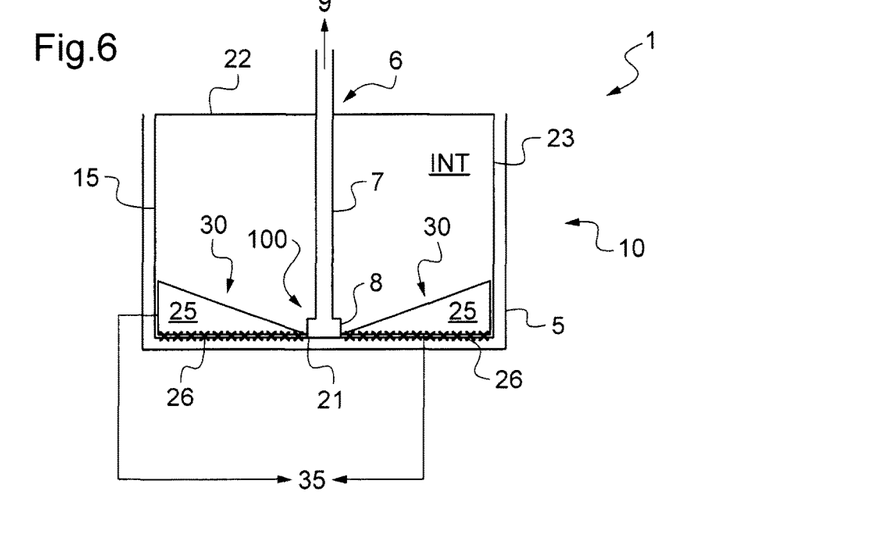
FIG. 6 is a view of an aircraft having a storage device in a second embodiment.

In the second embodiment of FIG. 6, the storage device comprises a system for providing both an expansion volume and also variable slopes at the bottom 21 of at least one tank, and in particular at the bottom of a tank including a predetermined fuel transfer zone 100.

The storage device 10 then has at least one inflatable bag 25 capable of being inflated on request, in particular so as to provide a slope 30 at the bottom of a tank. This slope 30 thus enables fuel contained in the tank to be directed by gravity towards the predetermined zone 100.

Thereafter, the storage device 10 is provided with inflation/deflation means 35 to inflate/deflate the inflatable bag 25 of at least one tank. By inflating or deflating an inflatable bag, the inflation/deflation means 35 enable the angle of inclination of the slope 30 as generated by the inflatable bag to be adjusted between a minimum position and a maximum position, and also to generate an expansion volume.

Figure 7:
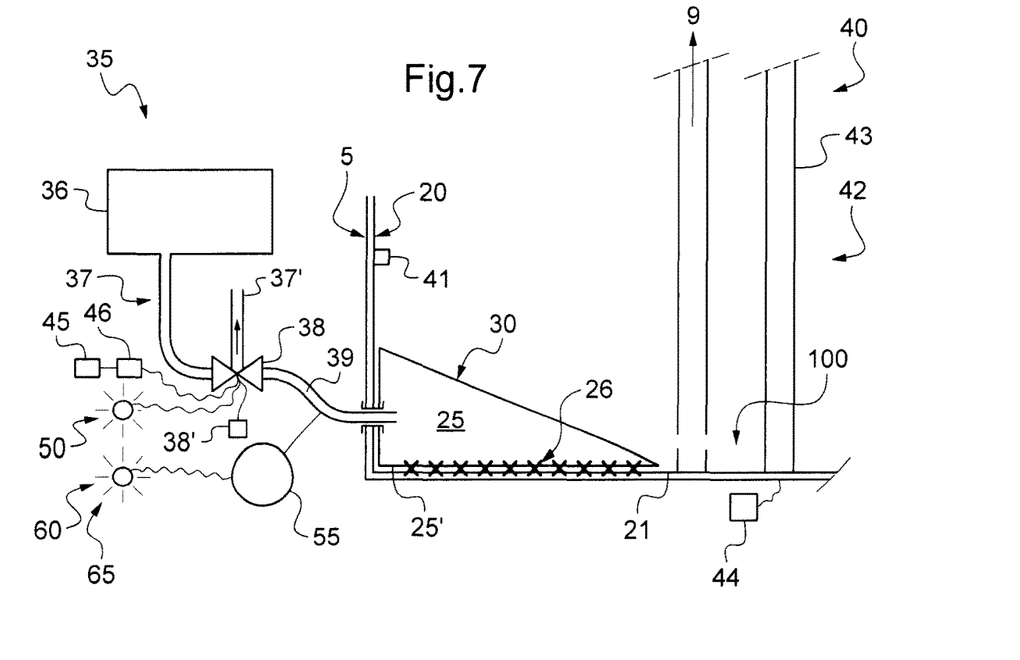
FIG. 7 is a fragmentary view of a storage device in the second embodiment.

With reference to FIG. 7, each inflatable bag may be placed inside the casing 20 of a tank.

Each inflatable bag is optionally fastened to the casing by reversible fastener means 26. By way of example, such reversible fastener means comprise a self-gripping strip making use of one layer provided with hooks and of another layer provided with loops.

For example, only the face 25' of an inflatable bag that is remote from the generated slope 30 is fastened to the casing of the tank. The inflatable bag may then be fastened on the bottom 21 of the casing.

In another variant, each inflatable bag is fastened in irreversible manner to the casing.

The inflation/deflation means 35 may also comprise at least one pressure generator 36.

A pressure generator 36 then communicates with at least one inflatable bag 25 via at least one hose pipe and a valve 38.

More precisely, a first pipe 37 connects a valve 38 to the pressure generator, and a second pipe 39 connects the valve to an inflatable bag.

The valve may occupy three positions so as to be connected to a fluid discharge pipe 37' for deflating an inflatable bag. The fluid discharge pipe 37' may be directed towards a pressure generator.

A single pressure generator may be used for inflating/deflating some of the inflatable bags, or indeed all of the inflatable bags, for example.

Any device for conveying fluid from a pressure generator to an inflatable bag may also be envisaged.

Optionally, each inflatable bag may have two independent compartments. The inflation/deflation means are then connected to each compartment. By way of example, the inflation/deflation means co-operate with a first compartment for generating an expansion volume in the tank, and with the second compartment for arranging a slope in the tank.

The inflation/deflation means 35 inflate or deflate the inflatable bags as a function of the stage of flight and as a function of the quantity of fuel present in the tank.

The internal storage space INT is reduced by inflating the inflatable bag. The invention thus proposes inflating the inflatable bags in predetermined situations both for the purpose of creating an expansion volume and also for the purpose of arranging slopes that enable fuel to be directed towards a predetermined zone.

Depending on the variant, the storage device is then provided with means for measuring the volume of fuel 40 contained in the tank, and/or a measurement system 45 for measuring flight duration, and/or manual control means 50 for controlling said inflation/deflation means 35.

In a first variant, the measurement means 40 for measuring the volume of fuel are connected to the inflation/deflation means 35 in order to adjust the angle of inclination of the slopes in the tank automatically as a function of the volume of fuel present in the tank.

The measurement means 40 may include a sensor 41 that changes state when the depth of fuel in the tank crosses a threshold. The sensor 41 may be connected to each valve 38 of inflation/deflation means 35, or indeed to processor means for analyzing the state of the sensor in order to control each valve 38, where appropriate.

The measurement means 40 optionally include a gauge system 42.

The gauge system 42 optionally comprises a fuel gauge 43 co-operating with a processor unit 44. By way of example, the fuel gauge 43 measures the depth of fuel in the tank.

The processor unit 44 deduces the volume of fuel contained on the basis of at least one gauging relationship for converting fuel depth into fuel volume.

The processor unit communicates with each of the valves 38 of inflation/deflation means 35, or indeed with processor means for analyzing the information coming from the processor unit in order to control each of the valves 38, where appropriate.

In a second variant, the storage device is provided with a measurement system 45 for measuring flight duration.

By calculation, the manufacturer can determine a flight duration for which it can be guaranteed that the inside space as reduced as a result of inflating the inflatable bags in flight is sufficient for containing the stored fuel.

The measurement system 45 then co-operates with the inflation/deflation means 35, optionally via a processor system 46.

In a third variant, the storage device includes manual control means 50 for controlling the inflation/deflation means 35, e.g. connected to each of the valves 38.

The valve may be provided with a position indicator 38'.

These variants may optionally be combined.

Furthermore, the storage device may include at least one pressure sensor 55 for estimating the pressure of the fluid contained in an inflatable bag.

The pressure sensor may co-operate with a pipe 39 of the inflation/deflation means 35.

The sensor serves to deliver information representative of the state of at least one inflatable bag, and under such circumstances it is representative of the angle of inclination of the slope generated by the inflatable bag.

For example, a low pressure indicates that an inflatable bag is deflated, whereas a high pressure indicates that an inflatable bag is inflated.

The pressure sensor may be associated with display means 60 displaying information relating to said slope and/or to warning means 65 for warning an individual that said bag is inflated, via a visible or audible alarm.

The display means and the warning means may be arranged in the same piece of equipment.

In addition, when the storage device 10 is provided with a gauging system 42 for measuring the depth of fuel in the tank 15, the gauging system 42 may include a gauging relationship for each angle of inclination that is authorized for the slopes in the tank.

Thus, by way of example, the storage device may apply one gauging relationship when the inflatable bags are deflated, and another gauging relationship when the inflatable bags are inflated.

FIGS. 8 to 17 explain the method implemented by this storage device.

Figure 8:
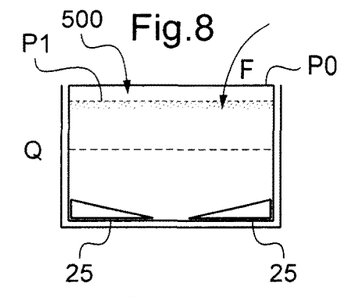
FIGS. 8 to 17 are views explaining the method of the invention implemented in the second embodiment.

With reference to FIG. 8, while on the ground and prior to filling, the inflatable bags are inflated, at least in part. Information may be forwarded to the crew to indicate that the bags are inflated, at least in part.

The tank may then be filled with fuel, with filling being represented by arrow F.

At the end of filling, the level of fuel in the tank may reach a level P0. At this point, the bags 25 are deflated so as to lower the level of fuel to a level P1.

The tank then presents an expansion volume corresponding at least to the volume of the bags prior to the beginning of filling.

Two situations may then arise. The free surface of the fuel may then either reach a threshold Q set by the manufacturer, or it may remain below the threshold Q. The threshold is defined by the manufacturer to guarantee that an expansion volume is present when the bags are inflated.

Figure 9:
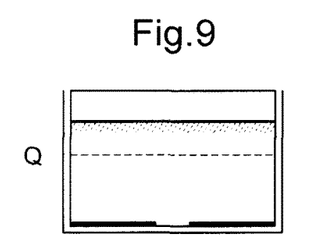

With reference to FIG. 9, when the free surface of the fuel reaches said threshold Q at the end of filling, the inflatable bags remain deflated.

Figure 10:
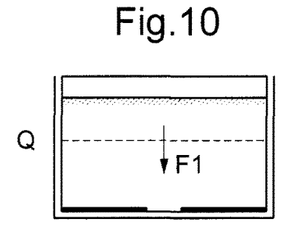

In contrast, and with reference to FIG. 10, the consumption of fuel by the engines of an aircraft, for example, leads to the level of fuel in the tank dropping, as represented by arrow F1.

Figure 11:
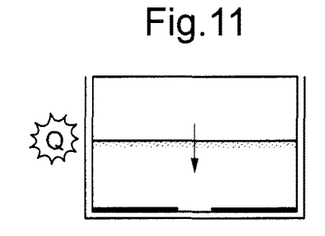

Thereafter, and with reference to FIG. 11, when the level of fuel drops below the threshold Q, inflation of the inflatable bags is triggered.

Figure 12:
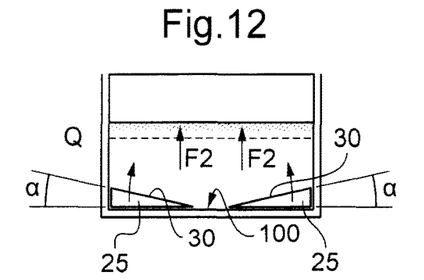

FIG. 12 shows the inflation of the inflatable bags. Each inflatable bag then defines a slope 30 that slopes towards a predetermined zone 100. Each slope thus presents an angle of inclination α relative to the bottom wall of the casing of the tank.

Under such circumstances, the level of fuel in the tank increases as represented by arrows F2. This level may go back above the threshold Q. Nevertheless, it should be understood that the inflatable bags then remain inflated.

The gauging relationship applied by a gauging system is then advantageously modified.

Figure 13:
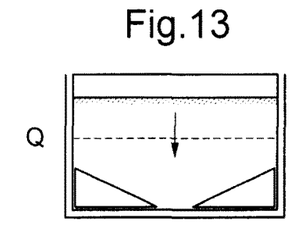

FIG. 13 shows a tank with inflatable bags that are fully inflated.

Figure 16:
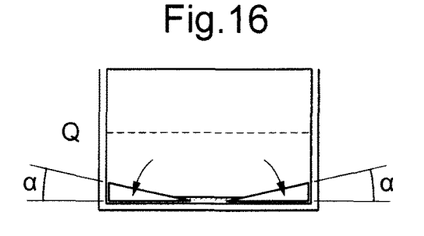

With reference to FIG. 16, the inflatable bags are deflated after a flight and on the ground, at the request of the crew, or indeed on stopping the engines, for example.

Figure 17:
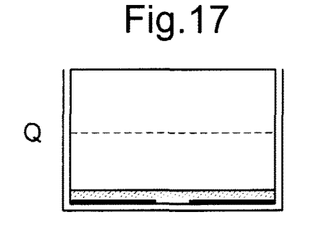

FIG. 17 then shows the state of the inflatable bags as a result of being deflated.

Figure 14:
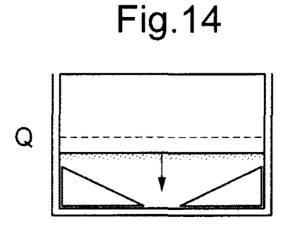
Figure 15:
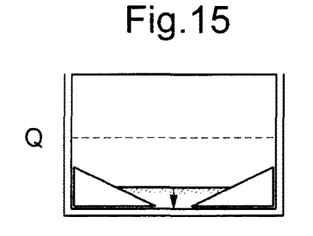

FIGS. 14 and 15 show the method in the event of a partial fill. FIGS. 14 and 15 may also apply to an intermediate stage of flight.

Consequently, when the fuel level does not reach the threshold Q at the end of filling, the inflatable bags are inflated at the end of filling. In other words, there is then no need to deflate the bags at the end of filling. If the bags have been inflated in part only, the bags may then be inflated completely. Deflation of the bags may also be inhibited in this configuration, e.g. by computer type inhibit means.

Depending on the variant, it can be understood that the threshold Q may for example represent a depth of fuel in the tank, or a volume of fuel, or indeed a duration of flight.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

By way of example, the first embodiment and the second embodiment may be combined.

What is claimed is:

1. A storage device for storing fuel, the device having at least one tank, the tank having a casing extending upwards from a bottom to a top wall, wherein the storage device is provided with at least one inflatable bag arranged inside the casing, the storage device including inflation/deflation means inflating each inflatable bag at least in part so as to reach an inflated volume prior to filling the tank, and for deflating the inflatable bag after filling in order to guarantee an expansion volume inside the tank, wherein the at least one inflatable bag is fastened to the bottom of the casing in order to provide the expansion volume and also to provide at least one slope having a variable angle of inclination to direct the fuel towards a predetermined zone of the tank by gravity, wherein the at least one inflatable bag is compartmentalized so as to present a first compartment for inflating/deflating the expansion volume, and a second compartment in order to provide the at least one slope.

2. A device according to claim 1, wherein the storage device includes measurement means for measuring a volume of fuel and connected to the inflation/deflation means in order to adjust the angle of inclination of the at least one slope automatically as a function of the volume of fuel.

3. A device according to claim 1, wherein the storage device includes a measurement system for measuring flight duration, and wherein the storage device includes a pressure sensor.

4. A device according to claim 1, wherein the storage device includes manual control means for the inflation/deflation means, and wherein the storage device is provided with display means for displaying information relating to the slope.

5. A device according to claim 1, wherein the storage device is provided with a gauging system for measuring a depth of fuel in the tank, and the gauging system includes a gauging relationship for each authorized angle of inclination of the slope, each gauging relationship providing a volume of fuel as a function of the depth.

6. An aircraft, including a storage device according to claim 1.

7. A method of storing fuel in a storage device, the storage device having at least one tank, the tank having a casing extending upwards from a bottom to a top wall, wherein the storage device is provided with at least one inflatable bag arranged inside the casing, the storage device including inflation/deflation means inflating each inflatable bag at least in part so as to reach an inflated volume prior to filling the tank, and for deflating the inflatable bag after filling in order to guarantee an expansion volume inside the tank, the method comprising inflating the at least one inflatable bag to a predetermined volume in order to provide an expansion volume in the tank prior to filling the tank with fuel, filling the tank with fuel while the at least one inflatable bag is at the predetermined volume, and then deflating the at least one inflatable bag after filling the tank with fuel.

8. A method according to claim 7, further comprising inflating the at least one inflatable bag when the volume of fuel in the tank is less than a predetermined threshold after filling the tank with fuel in order to provide a slope at the bottom of the tank enabling fuel contained in the tank to be directed by gravity towards a predetermined zone of the tank as a function of fuel level.

9. A method according to claim 7, wherein in order to provide a slope enabling fuel contained in the tank to be directed by gravity towards a predetermined zone, the following steps are performed:
when fuel volume is greater than a predetermined threshold after filling the tank with fuel, inflating the at least one inflatable bag once the volume of the fuel drops below the predetermined threshold; and
when fuel volume does not reach the predetermined threshold on filling the tank with fuel, inflating the inflatable bag at the end of filling.

10. A method according to claim 9, further comprising determining a gauging relationship to provide a volume of fuel as a function of a depth of fuel in the tank, and modifying the gauging relationship when the slope is modified.

11. A method according to claim 7, further comprising providing the storage device on an aircraft having at least one engine, and deflating the at least one inflatable bag when the engine is stopped.

12. A method according to claim 7, wherein the at least one inflatable bag is deflated at the end of filling the tank with fuel if the level of fuel exceeds a predetermined threshold level.

13. A method according to claim 7, wherein the at least one inflatable bag is deflated at the end of filling the tank with fuel, and the inflating and deflating of the inflatable bag taking place while the inflatable bag is on the ground.

14. A method according to claim 7, wherein the at least one inflatable bag is deflated immediately after filling the tank with fuel.

15. A method according to claim 7, wherein the inflatable bag is immersed in fuel when filling the tank with fuel.

16. A method of storing fuel in a storage device in an aircraft, the method comprising:
providing an aircraft having a fuel tank and an inflatable bag disposed within, and connected to, the fuel tank, the inflatable bag communicating with an inflation source to be inflatable between an inflated state, wherein the inflatable bag is inflated to a predetermined volume, and a deflated state, wherein the inflatable bag is deflated;
inflating the inflatable bag to the predetermined volume;
filling the fuel tank with fuel while the inflatable bag is inflated to the predetermined volume; and
after filling the fuel tank with fuel, deflating the inflatable bag from the predetermined volume to the deflated state to provide a free volume inside the fuel tank to provide an expansion volume for the fuel in the fuel tank.

* * * * *